United States Patent
Murphy et al.

(10) Patent No.: US 10,318,130 B2
(45) Date of Patent: Jun. 11, 2019

(54) CONTROLLING WINDOW USING TOUCH-SENSITIVE EDGE

(71) Applicant: Google Inc., Mountain View, CA (US)

(72) Inventors: David Joseph Murphy, San Francisco, CA (US); Nicholas Foster, Oakland, CA (US); Thomas Moltoni, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 198 days.

(21) Appl. No.: 15/375,787

(22) Filed: Dec. 12, 2016

(65) Prior Publication Data

US 2018/0164987 A1 Jun. 14, 2018

(51) Int. Cl.
*G06F 3/0484* (2013.01)
*G06F 3/0488* (2013.01)

(52) U.S. Cl.
CPC ...... *G06F 3/04845* (2013.01); *G06F 3/04883* (2013.01); *G06F 2203/04803* (2013.01)

(58) Field of Classification Search
CPC ..................................... G05F 3/14; G05F 3/17
USPC .......................... 715/740, 788, 799; 713/186
See application file for complete search history.

(56) References Cited

U.S. PATENT DOCUMENTS

| | | | |
|---|---|---|---|
| 4,672,558 A | 6/1987 | Beckes et al. | |
| 6,292,178 B1 | 9/2001 | Bernstein et al. | |
| 7,656,393 B2 | 2/2010 | Herbst et al. | |
| 8,522,308 B2 * | 8/2013 | Stinson, III | G06F 3/011 713/186 |
| 8,884,892 B2 | 11/2014 | Bakker | |
| 9,310,994 B2 | 4/2016 | Hinckley et al. | |
| 2009/0300541 A1 * | 12/2009 | Nelson | G06F 3/0481 715/799 |
| 2011/0246904 A1 * | 10/2011 | Pinto | G06F 9/452 715/740 |
| 2012/0206489 A1 | 8/2012 | Miyata | |
| 2014/0298252 A1 | 10/2014 | Choi et al. | |

(Continued)

FOREIGN PATENT DOCUMENTS

| | | |
|---|---|---|
| EP | 2752755 A1 | 7/2014 |
| EP | 2889747 A1 | 7/2015 |

OTHER PUBLICATIONS

International Search Report and Written Opinion for PCT Patent Application No. PCT/US2017/049048, dated Nov. 2, 2017, 13 pages.

(Continued)

*Primary Examiner* — Ruay Ho
(74) *Attorney, Agent, or Firm* — Brake Hughes Bellermann LLP

(57) ABSTRACT

A method includes: receiving, by a computing device, an input generated by a user touching a location on a touch-sensitive edge; determining whether a display contains a window split; when the display contains the window split, determining, in response to the input, whether the location is within a predefined proximity of the window split; when the location is within the predefined proximity of the window split, repositioning the window split on the display based on the input. When the display does not contain the window split, and when the location is not within the predefined proximity of the window split, a new window split can be created on the display, in response to the input, based on the location.

27 Claims, 9 Drawing Sheets

(56) References Cited

U.S. PATENT DOCUMENTS

| | | |
|---|---|---|
| 2014/0351748 A1 | 11/2014 | Xia et al. |
| 2015/0212639 A1 | 7/2015 | Wallace et al. |
| 2016/0124637 A1 | 5/2016 | Yoon et al. |
| 2016/0132174 A1 | 5/2016 | Yoo et al. |
| 2016/0231857 A1 | 8/2016 | Kano et al. |

OTHER PUBLICATIONS

Torres, "Microsoft Surface Pro 4 rumored to have ridiculously thin bezels", retrieved on Oct. 18, 2016 from http://www.slashgear.com/microsoft-surface-pro-4-rumored-to-have-ridiculously-thin-bezels-02407569/, Oct. 2, 2015, 10 pages.

Written Opinion for International Application No. PCT/US2017/049048, dated Nov. 5, 2018, 8 pages.

\* cited by examiner

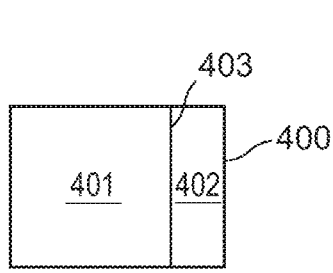
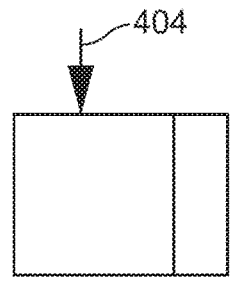
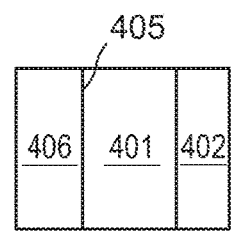
FIG. 4A  FIG. 4B  FIG. 4C
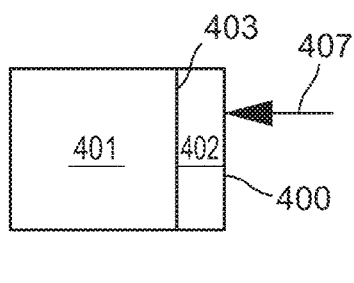
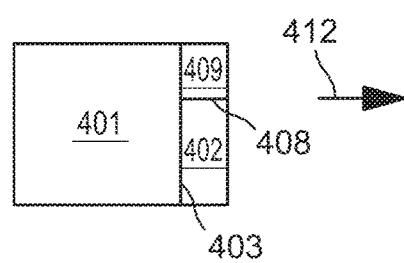
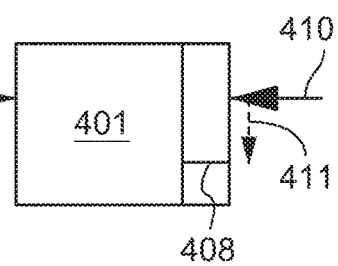
FIG. 4D  FIG. 4E  FIG. 4F
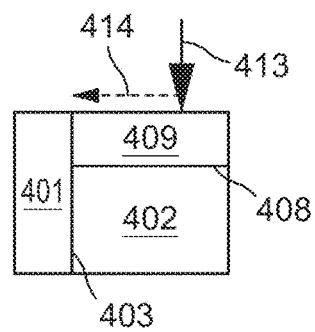
FIG. 4G

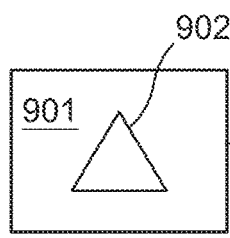 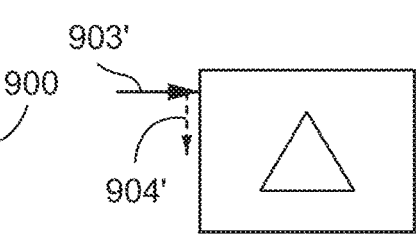 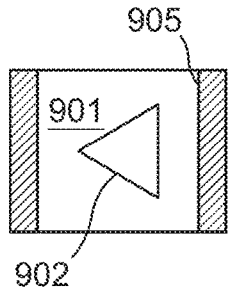
FIG. 9A    FIG. 9B    FIG. 9C
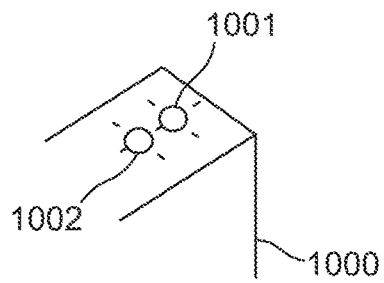 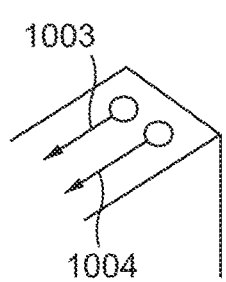
FIG. 10A    FIG. 10B
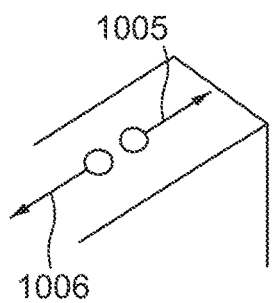 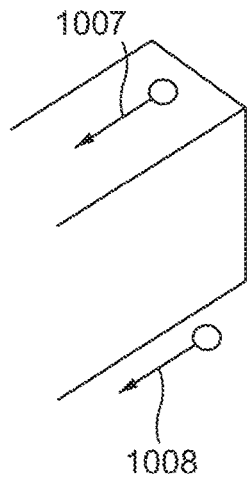
FIG. 10C    FIG. 10D

CONTROLLING WINDOW USING TOUCH-SENSITIVE EDGE

TECHNICAL FIELD

This document relates, generally, to controlling a displayed window using a touch-sensitive edge.

BACKGROUND

Many computer operating systems are configured to show content in one or more windows on the screen. When multiple windows are displayable at the same time, the system can provide for user control of the window as to its creation, position and/or size on the screen. This manipulation is to be distinguished from the user's interaction with content presented in the window. On some desktop displays a window is provided with a frame or other border that surrounds the window, and that may have touchpoints for manipulation using a cursor, and/or buttons for resizing. In displays of a smaller size, such as on mobile devices, window manipulation is sometimes provided for by way of a meta input, for example a multi-touch gesture, a double tap action, or a modal selection.

SUMMARY

In a first aspect, a method includes: receiving, by a computing device, an input generated by a user touching a location on a touch-sensitive edge; determining whether a display contains a window split; when the display contains the window split, determining, in response to the input, whether the location is within a predefined proximity of the window split; and when the location is within the predefined proximity of the window split, repositioning the window split on the display based on the input.

Implementations can include any or all of the following features. When the display does not contain the window split, and when the location is not within the predefined proximity of the window split, the method further includes creating, in response to the input, a new window split on the display based on the location. The display is included in a monitor, and the touch-sensitive edge comprises a touch-sensitive bezel on the monitor. To reposition the window split on the display, the user touches the location on the touch-sensitive edge and performs a swipe along the touch-sensitive edge, and the window split is repositioned on the display based on the swipe. The touch-sensitive edge comprises multiple adjacent edges, the predefined proximity comprises that the location is on a same edge as the window split and within a predefined distance of the window split, and when the location is not on the same edge as the window split then the location is not within the predefined proximity of the window split. The touch-sensitive edge is rectangular, and all four edges are touch sensitive. The display has the window split and the new window split is created, such that a first window is defined on one side of the window split, and second and third windows are defined on an opposite side of the window split, the second and third windows separated by the new window split, and wherein: (i) if another input is received that is made within the predefined proximity of the new window split on an edge adjacent the second and third windows, then the second and third windows, and not the first window, will be resized, whereas (ii) if the other input is made on an opposite edge adjacent the first window, then the first window, and not the second and third windows, will be resized.

Implementations can include any or all of the following features. The new window split is orthogonal to the window split. The new window split extends between the touch-sensitive edge and the window split. The method further includes receiving, after creating the new window split, another input generated using the touch-sensitive edge, wherein the other input repositions the window split on the display, and the repositioning resizes multiple windows defined in part by the new window split. Creating the new window split comprises diminishing a size of a window on the display, the method further comprising initiating a default window in a space created by the diminished size. Creating the new window split comprises diminishing a size of a window on the display, the method further comprising prompting the user to choose a new window to be initiated in a space created by the diminished size.

Implementations can include any or all of the following features. The method further includes receiving a clear-split input generated using the touch-sensitive edge, and clearing, in response to the clear-split input, at least the new window split from the display. The touch-sensitive edge is positioned on a housing that has multiple corners, and the clear-split input is generated by touching at least one of the corners. The clear-split input causes only a most recently created window split to be cleared. The window split is included on the display and defines a boundary between a first window and a second window, and wherein repositioning the window split on the display based on the input comprises enlarging the first window, and reducing the second window by an amount corresponding to the enlargement. The display is configured to have presented thereon windows without visible frames or other boundaries such that contents of adjacent windows abut each other. The computing device comprises a portable device in which a housing contains the display, the method further comprising distinguishing the input generated by the user touching the location on the touch-sensitive edge of the housing, from another input generated by the user when holding the portable device. The computing device comprises a proxy device separate from the display, the window split is associated with a proxy position on the proxy device, and the predefined proximity is defined relative to the proxy position, the method further comprising sending a signal to the display corresponding to either the repositioning of the window split on the display based on the input, or the creation of the new window split on the display. The touch-sensitive edge comprises at least an edge and a corner of a housing, and the input is generated using the edge of the housing, the method further comprising receiving another input generated using the corner of the housing, and, in response to the other input, actuating a rotary control in the computing device. The display contains the window split and the input includes a swipe gesture toward the window split, the method further comprising determining when the swipe gesture reaches a location of the window split, and thereafter matching the repositioning of the window split with the swipe gesture.

In a second aspect, a computer program product is tangibly embodied in a non-transitory computer-readable medium and includes executable instructions that, when executed, cause a computing device to perform operations including: receiving, by the computing device, an input generated by a user touching a location on a touch-sensitive edge; determining whether a display contains a window split; when the display contains the window split, determining, in response to the input, whether the location is within a predefined proximity of the window split; and when the location is within the predefined proximity of the window split.

Implementations can include any or all of the following features. When the display does not contain the window split, and when the location is not within the predefined proximity of the window split, the operations further include creating, in response to the input, a new window split on the display based on the location. To reposition the window split on the display, the user touches the location on the touch-sensitive edge and performs a swipe along the touch-sensitive edge, and the window split is repositioned on the display based on the swipe.

In a third aspect, a system includes: a display; a computing device having a touch-sensitive edge; and a computer program product tangibly embodied in a non-transitory computer-readable medium and including executable instructions that, when executed, cause the computing device to perform operations including: receiving, by the computing device, an input generated by a user touching a location on the touch-sensitive edge; determining whether the display contains a window split; when the display contains the window split, determining, in response to the input, whether the location is within a predefined proximity of the window split; and when the location is within the predefined proximity of the window split, repositioning the window split on the display based on the input.

Implementations can include any or all of the following features. When the display does not contain the window split, and when the location is not within the predefined proximity of the window split, the operations further include creating, in response to the input, a new window split on the display based on the location. The display is included in the computing device. The touch-sensitive edge comprises a touch-sensitive bezel on a housing of the computing device. The display is touch-sensitive, and wherein the touch-sensitive edge is part of the touch-sensitive display.

BRIEF DESCRIPTION OF DRAWINGS

FIGS. 4A-G show examples of creating an additional parallel window split, creating an additional orthogonal window split, and of moving an orthogonal window split.

FIGS. 9A-C show an example of manipulating a window using a touch-sensitive edge.

FIGS. 10A-D show examples of multi-finger touches.

Like reference symbols in the various drawings indicate like elements.

DETAILED DESCRIPTION

This document describes examples of using a touch-sensitive edge to control windows on a display. In some implementations, the edge is a bezel of a monitor and this can allow a user to resize and/or rearrange windows in a way that is convenient and intuitive. For example, the user taps the bezel at a desired location for positioning, or swipes along the bezel for repositioning. This approach can eliminate the need to provide the displayed window(s) with a surrounding frame or other border that could otherwise be used for manipulation, while allowing the user to interact with the content of the window in the usual way. In another implementation, the touch-sensitive edge can be formed on the screen of a touch-sensitive display. As another example, the touch-sensitive edge can be positioned on a proxy device that is separate from the display, such that a user can control windows presented on the display from a distance.

Figure 1A:
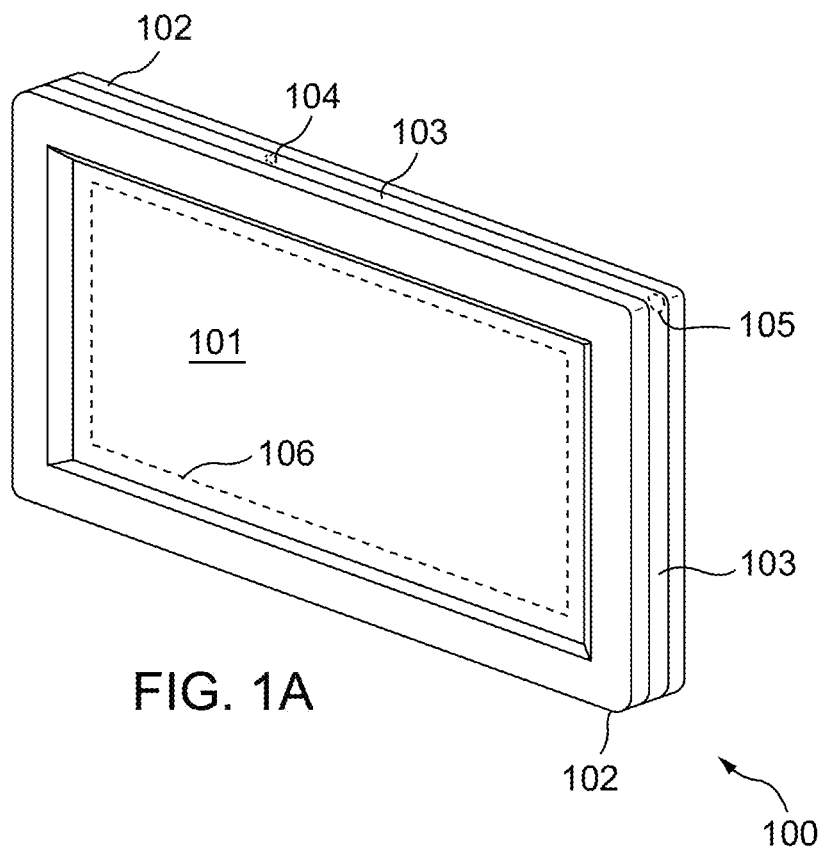
FIGS. 1A-B show examples of a monitor and a proxy device, respectively.
Figure 1B:
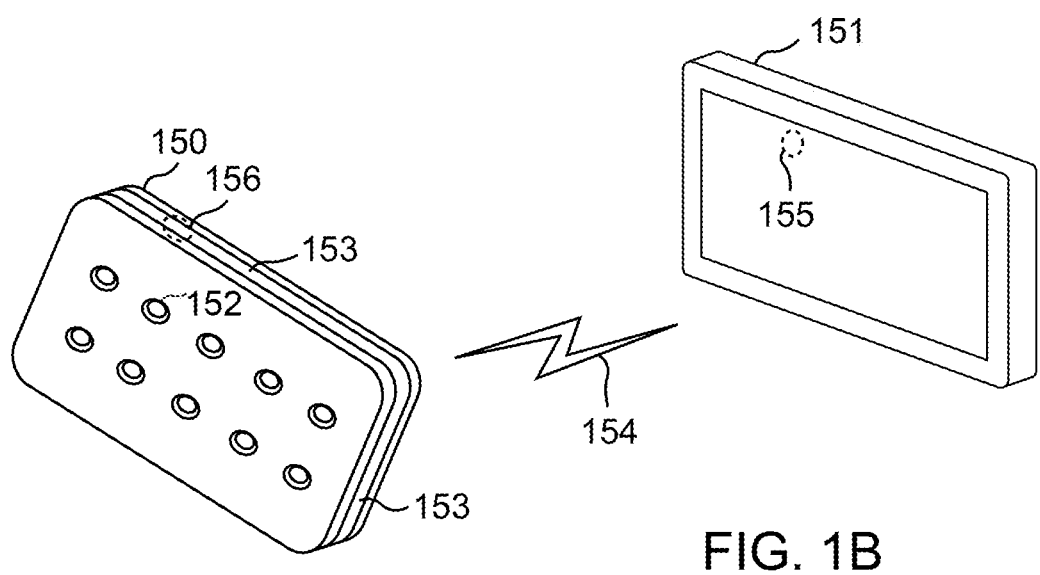

FIGS. 1A-B show examples of a monitor 100 and a proxy device 150, respectively. The monitor 100 has a display surface 101. The display surface can use any suitable display technology, including, but not limited to, liquid-crystal display technology. In some implementations, the monitor 100 is intended to be essentially stationary during use. For example, the monitor is a standalone monitor designed for being connected to a desktop computer or a laptop. In some implementations, the monitor is portable. For example, the monitor is included in a smartphone or a tablet.

The monitor 100 has a bezel 102. In some implementations, the bezel 102 extends around an entire perimeter of the monitor. For example, the bezel can include four edges (e.g., respective upper, lower, left and right edges). For example, the bezel can have a generally prismatic profile in cross section such that the bezel at least partly encloses the components of the monitor while providing an opening where the display surface 101 is visible.

The monitor 100 has a touch-sensitive edge 103. The touch-sensitive edge 103 can extend around the entire perimeter of the monitor, or over only one or more parts of the perimeter. In some implementations, the touch-sensitive edge 103 is an element that is provided onto the bezel 102. Any suitable sensor technology for touch sensitivity can be used, including, but not limited to, a resistive element, a capacitive element, a pressure-sensitive element, a heat-sensitive element, or combinations thereof. For example, in one implementation a resistive strip is applied around essentially the entire bezel 102. Detection circuitry can be coupled to the touch-sensitive edge so that the touching of the resistive strip with a finger or a hand is detected, and the location of the touch (e.g., where along the perimeter) can be determined with suitable accuracy. For example, user touching of the bezel at a location 104 along the upper edge is detected so that the location can be identified. As another example, user touching of a location 105 on a corner of the bezel can be detected so that the corner location can be identified. That is, the touch-sensitive edge can include a touch-sensitive bezel on a housing of the monitor.

In some implementations, the display surface 101 is a touch-sensitive display. Any suitable touchscreen technology can be used, including, but not limited to, capacitive sensing. For example, this can allow a user who is accustomed to using touch gestures on the display (e.g., taps or swipes) to also control window creation, positioning and/or resizing using the edge of the device.

The entire display surface 101 can be touch sensitive. The entire surface may then in principle be addressable for output and/or input relating to the operating system and/or any application running under it. An edge portion of the display can be dedicated to windows management, as opposed to, for example, interaction with contents of one or more windows. Here, an edge 106 of the display surface 101 is a touch-sensitive edge. The edge 106 can extend around the entire display surface or only one or more portions thereof. The edge 106 can be indicated visually on the screen in some way, or it can be invisible. Providing the edge 106 can allow the remainder of the display surface to be dedicated to presenting window contents, without devoting screen real estate to frames or other borders that would be used for window manipulation. For example, detection logic is applied to the inputs generated using the edge 106 so that the user's touching of the edge for window manipulation purposes is distinguished from other touchscreen gestures, such as scrolling and edge swiping.

With the touch-sensitive edge 103 and/or the edge 106, one or more edges can be touch sensitive. For example, all four edges surrounding a rectangular display can be touch sensitive. As another example, less than the entire edge can be touch sensitive, such as when only one horizontal edge (e.g., the upper or lower edge), and/or one vertical edge (e.g., the left or right edge) are touch sensitive.

In FIG. 1B, the proxy device 150 is configured for operation in conjunction with a monitor 151 and/or other devices (not shown for clarity). The monitor 151 can have a touch-sensitive edge, similar to the examples above. However, the proxy device 150 can provide another way of facilitating convenient and intuitive windows management, for example as will be described below.

In some implementations, the proxy device is a computing device that is designed to perform some function, such as to serve as a remote control for the monitor 151. For example, one or more buttons 152 or other input controls can be provided for this or another purpose. In some implementations, the proxy device 150 can have its own display (not shown for clarity). For example, the proxy device can be a handheld device such as a smartphone or a tablet.

The proxy device 150 has a touch-sensitive edge 103. The edge can extend around the entire perimeter of the proxy device or only one or more parts thereof. Any suitable touch-sensing technology can be used to provide the edge, including, but not limited to, those mentioned in examples above.

The proxy device 150 with the touch-sensitive edge 153 provides a way for a user to control one or more windows presented on the display of the monitor 151. The proxy device 150 is configured to communicate with the monitor in any suitable way. For example, a wireless signal 154 is here schematically illustrated. In some implementations, two-way communication can be provided. In some implementations, the proxy device generates the image content to be presented by the monitor and transmits it (e.g., via the wireless signal 154) for presentation. In other implementations, the proxy device makes input to another computing device (not shown for clarity), which then generates the image content and forwards it to the monitor. In some implementations, the monitor 151 is included in a computing device.

The proxy device 150 can be used for windows control that is based on screen positions. In some implementations, a position 155 on the display of the monitor 151 can correspond to the position and/or size of a window. For example, the position 155 can mark the position of a boundary between two windows. On the proxy device 150, moreover, a proxy position 156 can be defined that corresponds to, or in some other sense represents, the position 155. For example, the monitor 151 and the proxy device 150 may both be generally rectangular in shape (albeit possibly of different aspect ratios). The position 155 has a relationship to the overall size and shape of the display on the monitor 151. Using this relationship, a corresponding relationship based on the shape and size of the proxy device can be defined. For example, the horizontal displacement of the position 155 relative to some fixture (e.g., a corner) can be determined, and translated to a corresponding horizontal displacement of the proxy position 156. Thus, for example, the proxy position 156 can be defined based on the position 155 on the screen. The proxy position can then be used as a reference when a user is touching the touch-sensitive edge 153 of the proxy device 150, for example as will be described below.

A user pointer (not shown) can be presented on the screen. In some implementations, this can provide feedback to the user if there is little or no calibration or alignment between the sensor(s) of the touch-sensitive edge and the screen.

Examples will now be described with reference to FIGS. 2A-C, FIGS. 3A-E, FIGS. 4A-G and FIGS. 5A-G that illustrate some interactions that a user can make with one or more displayed windows using a touch-sensitive edge. For simplicity, these illustrations will schematically show the displayed screen, using rectangular boxes to represent the respective windows. The content of the individual windows is not explicitly shown. The touch-sensitive edge or edges, moreover, are not explicitly shown. Rather, the user's touch is schematically illustrated using one or more arrows in the figure. It will be understood that the user can make this touch input using any or all ways described herein, including, but not limited to, by a touch-sensitive bezel and/or by a touch-sensitive edge on a touchscreen.

Figure 2A:
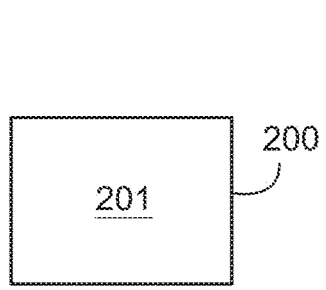
FIGS. 2A-C show examples of creating a new window split.
Figure 2B:
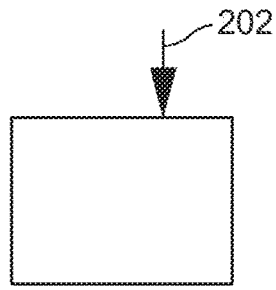
Figure 2C:
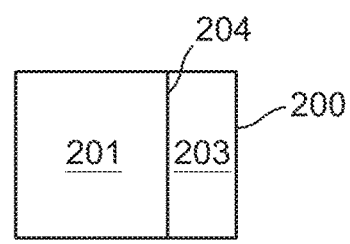

FIGS. 2A-C show examples of creating a new window split. A display 200 is here shown, which without limitation can include any display described herein. A window 201 is currently displayed. The window presently occupies essentially the entire visible area of the display 200. For example, the window 201 is associated with a particular application program, or is a desktop or other background image generated by the operating system.

Assume now that the user wishes to have also other window content be displayed. The user may therefore wish to split the screen so that the screen space is used not only by the window 201 but also by one or more other windows. For example, this can allow the user to run a separate independent application program that also will generate visual output and that the user can interact with. As another example, the other application program can provide additional functionality for the application program that is currently displayed in the window 201.

To accomplish the splitting of the screen space, the user can place one or more fingers on the touch-sensitive edge of the display 200. FIG. 2B schematically illustrates the user's touch by way of an arrow 202. The touch can be made at any position on the touch-sensitive edge, unless that position is dedicated for another function, such as for undoing earlier split commands. Here, the arrow 202 indicates that the user touches the upper edge of the monitor, somewhere between the middle and the right side thereof.

Based on this input, a new split between two or more windows can be created on the display 200. FIG. 2C shows that in this example the window 201 has been diminished in the horizontal direction, and a new window 203 is being presented. The boundary between the windows 201 and 203 is here referred to as a window split 204. The window split 204 was created at or essentially at the horizontal location represented by the input received based on the user touching the touch-sensitive edge.

That is, the window split 204 currently defines the rightmost edge of the window 201, and the leftmost edge of the new window 203. For example, the window 201 occupies a majority of the screen, and the window 203 the remaining area. Other respective edges of the windows 201 and 203 are currently not defined by a window split. For example, they can be defined by the physical dimensions of the display 200.

That is, creating the window split 204 can include diminishing a size of the window 201, and providing new window content in form of the window 203 to fill the created space, or to allow a preexisting background to become partially visible. In some implementations, the new window 203 is a default window, meaning that it provides content that should appear by default upon creating a new window split. In some implementations, the new window 203 corresponds to the system prompting the user to choose which new window (e.g., which content) should be initiated in the created space. For example, two or more possible choices of content for the new window can be presented.

In this example, the window split 204 between the windows 201 and 203 can be essentially one-dimensional. That is, no visible frames or other boundaries need be provided on either of the windows 201 and 203. Rather, the contents of such adjacent windows can abut each other along the window split.

In this example, a new window split is generated when the user touches an edge. In other implementations, upon the user touching an edge, the system can check whether the touching is directed toward relocation of an existing window split, and if that is not the case, the new window split can be created, for example as will be described below.

Figure 3A:
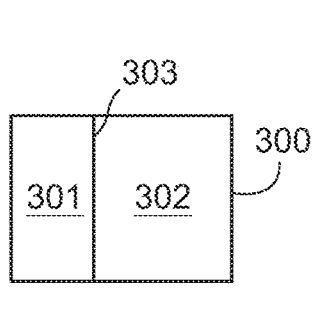
FIGS. 3A-E show examples of moving and clearing a window split.

FIGS. 3A-E show examples of moving and clearing a window split. In FIG. 3A, a monitor 300 currently displays a window 301 adjacent another window 302, as indicated by a window split 303. The window split 303 may have been created along the lines as described above, or in another way (e.g., by manipulation of on-screen windows control features such as frames or resizing buttons). Currently the window 301 occupies a minority of the screen, and the majority is occupied by the window 302.

Figure 3B:
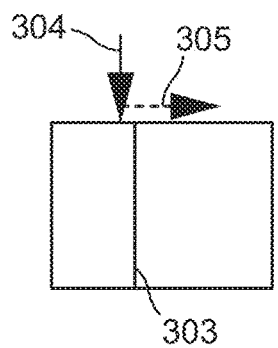

Assume now that the user wishes to see more of the window 301, or less of the window 302. This can be accomplished using a touch-sensitive edge of the monitor 300. FIG. 3B shows that the user touches the edge, as indicated by an arrow 304. The location of the user's touching is on the same edge as, and horizontally near the position of, the window split 303. In some implementations, a predefined distance is established against which spatial closeness along the same edge is measured. For example, the arrow 304 is here touching the edge (i.e., the upper edge) against which the window split 303 is defined, and it is also close to the position of that split in the horizontal direction. The touch represented by the arrow 304 can therefore be considered to be within a predefined proximity of the window split 303. On the contrary, a touch that is on a different edge than an existing window split, whether spatially near or far from that split, can be deemed not to be within a predefined proximity in some implementations, for example as will be described below.

The touching within the predefined proximity can signal to the system that the user may wish to reposition an existing window split. Such repositioning can be accomplished by in a sense dragging the window split by way of a swipe along the edge, and dropping the window split at a desired new location by way of removing the finger(s) from the touch-sensitive edge. Here, after touching the edge as indicated by the arrow 304, the user swipes his or her finger(s) to the right along the edge, as schematically illustrated by an arrow 305, where the dashed arrow represents sliding movement in one or more directions. Accordingly, the user here performs a swipe along the touch-sensitive edge.

Figure 3C:
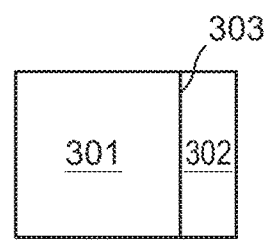

The window split 303 can be repositioned on the monitor 300 based on the swipe. FIG. 3C shows that the window split 303 has been repositioned to a location essentially corresponding to where the user's swiping gesture ended. As a result, the size of the window 302 has been reduced, and the window 301 has been enlarged accordingly.

Some implementations can perform a method that includes receiving, by a computing device, an input generated by a user touching a location on a touch-sensitive edge. The method can include determining whether a display contains a window split. When the window contains the window split, the method can include determining, in response to the input, whether the location is within a predefined proximity of the window split. When the location is within the predefined proximity of the window split, the method can include repositioning the window split on the display based on the input. When the display does not contain the window split, and when the location is not within the predefined proximity of the window split, the method can include creating, in response to the input, a new window split on the display based on the location.

With reference again briefly to FIGS. 1A-B, the input can be generated using the touch-sensitive edge 103 or the touch-sensitive edge 153 to name just two examples. When the computing device includes a proxy device separate from the display, the window split can be associated with a proxy position on the proxy device, such as the proxy position 156. The predefined proximity can be defined relative to the proxy position. For example, if the user touches the proxy device 150 on the same edge as the proxy position and near the proxy position, the touch can be deemed to be within the predefined proximity. On the other hand, if the user touches the proxy device on a different edge than where the proxy position is located, the touch can be deemed not to be within the predefined proximity whether the spatial distance is less or more than a predefined distance. The method can further include sending a signal to the display corresponding to either the repositioning of the window split on the display based on the input, or the creation of the new window split on the display. For example, the wireless signal 154 can instruct the monitor 151 to make a change regarding two or more displayed windows, or the signal can contain image content configured to be displayed by the monitor.

Figure 3D:
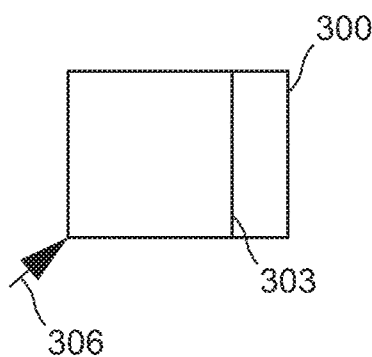
Figure 3E:
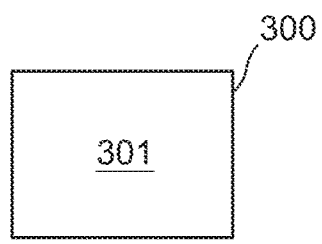

The user may wish to clear one or more window splits on the screen. In some implementations, this can be done by touching a designated location on the touch-sensitive edge. FIG. 3D shows an example where the user touches the corner of the monitor 300, as indicated by an arrow 306. Here, the user touches the lower left corner of the monitor at a time when the window split 303 is present on the display. This can be considered a clear-split input. One or more window splits can be cleared in response to a clear-split input. For example, FIG. 3E shows that the window split 303 has been cleared. In this example, only the window 301 remains on the monitor 300 after the clear-split input. For example, the window split 303 may be cleared by the clear-split input because it was the most recently created window split. In other implementations, more than one window split can be cleared by each clear-window input. For example, all existing window splits can be cleared. The clear-split input can be made using any suitable form of input, such as by touching a corner as in the above example. In some implementations, two or more corners of the touch-sensitive edge can serve to generate different inputs.

Edge swipe gestures can default to a "move" behavior. In some implementations, the swipe corresponding to the arrow 305 can "catch" the window split 303 as the user's finger reaches the location of the split (i.e., at the moment of coincidence), and then move the split to the user's intended location. As such, from the moment of coincidence, the system can essentially match the movement of the window split to the movement of the user's finger along the touch-sensitive edge. For example, this can allow the user to employ a less precise gesture and yet accomplish a desired result. This swipe-to-catch functionality may require that the swipe begin within a predefined proximity of the existing window split.

FIGS. 4A-G show examples of creating an additional parallel window split, creating an additional orthogonal window split, and of moving an orthogonal window split. FIG. 4A shows that a monitor 400 currently has windows 401 and 402 displayed thereon, as indicated by a window split 403. Assume now that the user wishes to see additional content, or interact with a different application program. This can be accomplished by introducing another window split. FIG. 4B shows that the user touches the touch-sensitive edge at the upper edge of the monitor, as indicated by an arrow 404. In response, a new window split can be created. FIG. 4C shows that a new window split 405 has been created. This corresponds to a window 406 being displayed, in addition to the windows 401 and 402. Here, window 401 has been diminished to create space for the new window 406.

In some implementations, the new window split 405 is created in response to, and at the location of, the user's touching regardless of whether any other window split exists on the screen. In other implementations, the system can first determine that the touch represented by the arrow 404 is not within a predefined proximity of an existing window (if any).

Window splits can be created in more than one direction. For example, two or more window splits can be orthogonal to each other. FIG. 4D shows an example where the user touches the right side of the touch-sensitive edge, as indicated by an arrow 407. This occurs at a time when the monitor 400 has displayed thereon the windows 401 and 402, as indicated by the window split 403 (similar to FIG. 4A). Here, the edge at which the user's touch is made is orthogonal to the edges against which the window split 403 is defined, namely the upper and lower edges.

In response to the user's touch, a new window split can be created. FIG. 4E shows that a window split 408 has been created. The window split 408 is the boundary between the window 402 (now resized) and a new window 409. The window 401, by contrast, is not resized or otherwise altered in this example. Accordingly, a new window split can be created that is orthogonal to one or more existing window splits. For example, the window split 408 here extends between the touch-sensitive edge (i.e., the right side thereof) and the window split 403.

That is, the window split 408 was here created in response to a touch although it may have been within a predefined distance of an existing window split (i.e., the window split 403) because the user's touch was made on a different edge than one against which the existing window split was defined. Accordingly, the predefined proximity can include that the location of the touch is on the same edge as the existing window split and within a predefined distance thereof. By contrast, when the location is not on the same edge as the existing window split then the location can be deemed not to be within the predefined proximity of the window split. Compare, for example, the situation in FIG. 4E, where a new split was created, with the one in FIG. 3B, where the touch was deemed to be for repositioning, not creation of a new split.

The window split 408 can be relocated, for example as discussed above. FIG. 4F shows that the user touches the right-side edge, as indicated by an arrow 410, and performs a swipe gesture, as indicated by an arrow 411. Here, the touch corresponding to the arrow 410 can be deemed to be within a predefined proximity of the window split 408 (see position in FIG. 4E). The window split 408 can therefore be repositioned in response to the swipe gesture, for example to a location as indicated in FIG. 4F.

As noted, if a touch is made on an edge different from (e.g., orthogonal or parallel to) the edge against which an existing window split is defined, the touch can be deemed not to be within a predefined proximity of that split. Referring still to FIG. 4F, an arrow 412 represents an illustrative position that the user could touch on the edge that is opposite the one defining the window split 408. Accordingly, if the user were to make this touching and swipe in either direction, this would not result in the repositioning of the window split 408 that is illustrated in FIG. 4F, because the arrow 412 corresponds to a touching on a different edge (e.g., the opposite one) than where the window split 408 is defined. Rather, the subject touch would result in a new window split being created on the left side of the screen, thus diminishing the window 401.

Referring once again briefly to FIG. 4E, the user may wish to make the window 401 smaller, or the windows 402 and 409 larger. This can be accomplished using the touch-sensitive edge. FIG. 4G shows that the user touches the upper edge of the monitor, as indicated by an arrow 413. The user also performs a swipe gesture, here to the left, as indicated by an arrow 414. As a result, the window split 403 is repositioned to the left, and the window split 408 is extended further from the right edge than before. This corresponds to an enlarging of the windows 402 and 409, and a corresponding diminishing of the size of the window 401. That is, this illustration shows that after a new window split is created (e.g., the window split 408) a repositioning of an existing window split (e.g., the window split 403 can be performed. For example, the repositioning can resize multiple windows (e.g., the windows 402 and 409) that are defined in part by the new window split (e.g., the window split 408).

Inputs on a touch-sensitive edge in addition to the examples above (e.g., a single touch or a swipe) can be recognized. In some implementations, a meta-touch can be recognized. For example, the system can register a series of two or more touches in rapid succession, at approximately the same area of the touch-sensitive edge, as a separate input which can trigger different functionality, such as according to the following example.

Figure 5A:
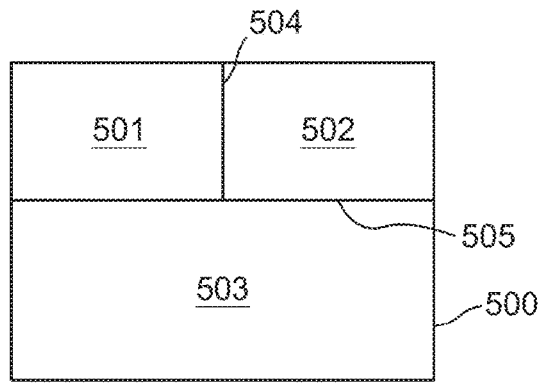
FIGS. 5A-E show examples of repositioning a window split.
Figure 5B:
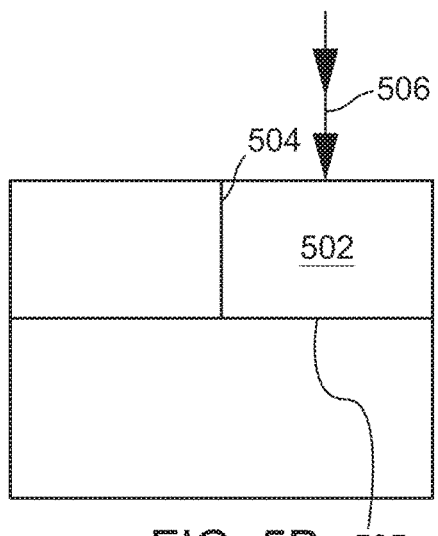

FIGS. 5A-E show examples of repositioning a window split. Here, a monitor 500 currently has displayed thereon windows 501, 502 and 503, corresponding to respective window splits 504 and 505. Assume now that the user wishes to switch positions of the windows 501 and 502. This can be accomplished using a touch-sensitive edge. FIG. 5B shows that the user makes a double tap on the touch-sensitive edge, as schematically illustrated by a double arrow 506. The touch is made on the upper edge at the window 502. Because this double tap can be distinguished from other kinds of touches (e.g., as exemplified earlier) it does not trigger resizing of a window. Rather, it can trigger a repositioning of a window split in the sense that one or more windows are relocated to a new position on the screen.

Figure 5C:
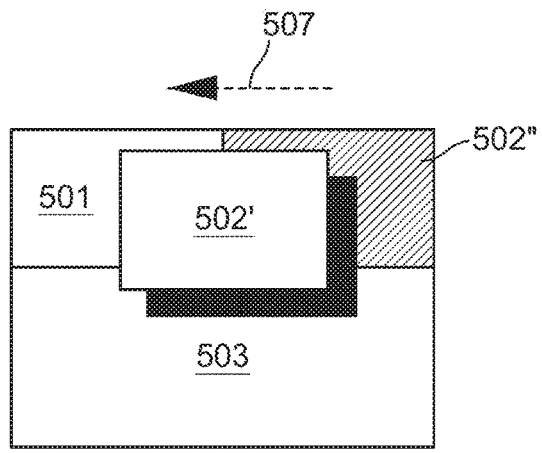

FIG. 5C shows that the user performs a swipe gesture, as indicated by an arrow 507. In response, the system can display a window 502' that corresponds to a moveable representation of the window 502 (FIG. 5B) which may no longer be visible. A space 502" is created by the moving of the window 502'. The windows 501 and 503, in contrast, may not be immediately affected by this movement. That is, the window split 504 (FIG. 5B), which used to define where the left edge of the window 502 meets the right edge of the window 501, is being repositioned in that the window 502 (represented by the window 502') is being positioned to the left of the window 501.

Figure 5D:
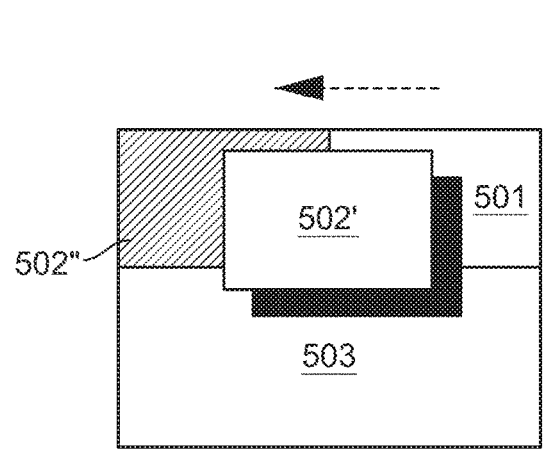

The system can periodically monitor whether any of the windows that are not currently being moved (here, windows 501 and 503) should be repositioned to make room for the window being moved (here, window 502'). FIG. 5D shows that the system repositions the window 501 to the former location of the moved window, thus positioning the space 502" at the original location of the window 501. For example, this can occur (refer to FIG. 5C) as the window 502' is moved so that it is closer to the position of the window 501 than to the space 502".

Figure 5E:
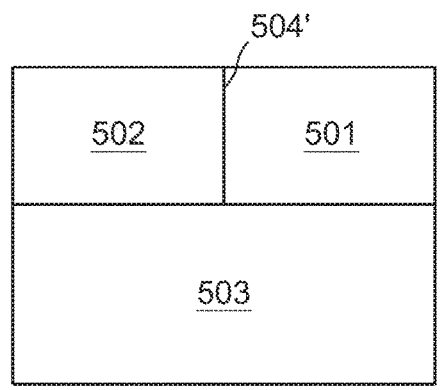

When the user ceases the input or takes another action, the moved window can be positioned in the available space. For example, this can be the nearest space that is not occupied by a window. FIG. 5E shows that the window 502 is now positioned to the left of the window 501, as opposed to before (see FIG. 5A). This corresponds to repositioning of the window split 504 (e.g., FIG. 5A) into a new window split 504'. The window 503, by contrast, may not be affected by this move.

In the above example, the input made using the touch-sensitive edge causes a relocation of windows without resizing either of them. In other situations, one or more windows can be resized as a result of a touch input. In some implementations, a window split can be removed, thus leading to one or more existing windows being removed in favor of the remaining window(s). Thus, a touch-sensitive edge can be used to control creation, positioning, sizing and/or removal of one or more windows displayed on a screen.

Figure 6:
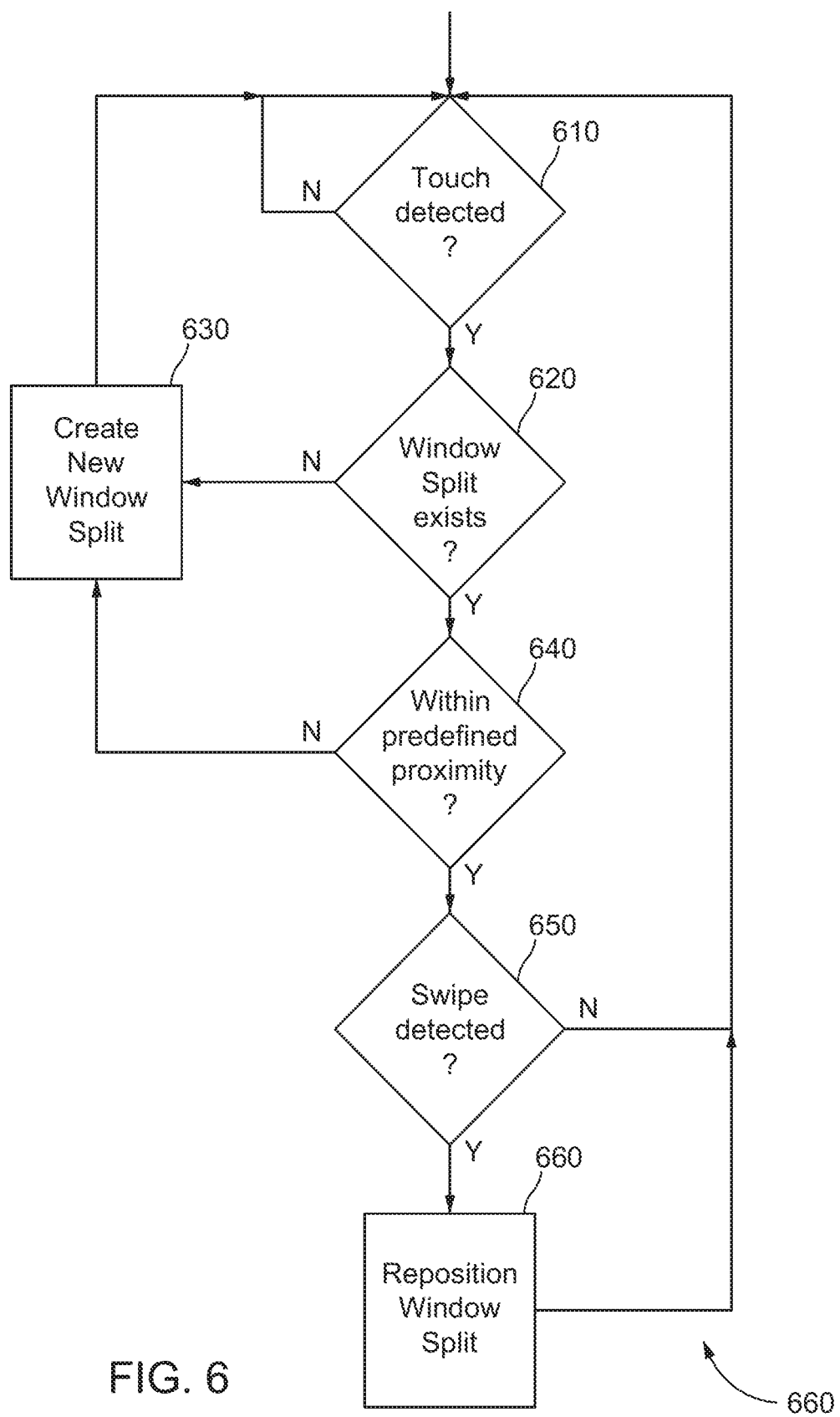
FIG. 6 shows an example of a flowchart.

FIG. 6 shows an example of a flowchart 600. The flowchart illustrates a method that can be performed in any or all examples described herein, including in, but not limited to, the monitor 100 or the proxy device 150 (FIGS. 1A-B). For example, a processor executing instructions stored in a computer program product, tangibly embodied in a non-transitory computer-readable medium, can perform these and/or other operations. Two or more operations can be performed in a different order unless specifically indicated. More or fewer operations can be performed in some implementations.

At 610, it is determined whether a touch on a touch-sensitive edge is detected. In some implementations, the touch can be made using a touch-sensitive bezel (e.g., on a monitor or a proxy device) and/or by an edge of a touchscreen or other touch-sensitive display. When the bezel of a handheld device is made touch-sensitive, the system can distinguish the input generated by the user touching the touch-sensitive edge from another input inadvertently generated by the user when holding the portable device. For example, the system may only respond to inputs corresponding to a single finger touching the particular edge, as opposed to, say, the input of the entire hand or multiple fingers on the same edge. The determination at 610 can continue until the touch is detected.

At 620 a determination is made whether at least one window split exists on the screen. If not, the system can decide that the user is seeking to create a new window split on the screen. Accordingly, at 630 a new window split can be created. The split is created in a position corresponding to the location where the user touched the edge. Thereafter, the process can return to 610 and await another touch on the edge (or other operations can be performed).

If a window split is determined to exist at 620, then it can be determined at 640 whether the detected touch is within a predefined proximity of the existing window split(s). For example, this can take into account whether the touch and the split are on the same edge or different edges, and/or whether the touch is spatially sufficiently close to the split. If the touch is not within the predefined proximity, then the process can continue to 630 where a new window split can be created.

When the detected touch is within the predefined proximity of the existing window split(s) at 640, then the process can continue to 650, where it is determined whether a swipe is detected. For example, this determination can occur for a predetermined amount of time after the touch is detected. If no swipe is detected, the process can return to 610.

If a swipe gesture is detected at 650, then the process can continue to 660, at which a window split can be repositioned. For example, and without limitation, this repositioning can include a horizontal repositioning (e.g., FIGS. 3A-C), a vertical repositioning (e.g., FIGS. 4E-F), and/or a relocation of windows (e.g., FIGS. 5A-E).

The above and/or other operations can be performed in a system, including, but not limited to in the monitor 100 or in the proxy device 150 (FIGS. 1A-B). In some implementations, the system can include a display, a computing device having a touch-sensitive edge, and a computer program product having instructions for the processor. For example, the display can be included in the computing device, such as in the monitor 100. For example, the touch-sensitive edge can include a touch-sensitive bezel on a housing of the computing device, such as in the monitor 100. For example, the display can be touch-sensitive, and the touch-sensitive edge can be part of the touch-sensitive display, such as with the edge 106 (FIG. 1A).

Examples will now be described with reference to FIGS. 7A-C, FIGS. 8A-C and FIGS. 9A-C that illustrate some interactions that a user can make with one or more displayed windows using a touch-sensitive edge. Similar to implementations described earlier, these examples schematically show the displayed screen, and that touch-sensitive edge or edges are not explicitly shown. It will be understood that the user can make a touch input using any or all ways described herein, including, but not limited to, by a touch-sensitive bezel and/or by a touch-sensitive edge on a touchscreen.

Figure 7A:
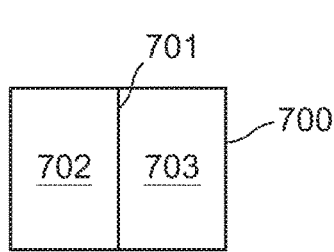
FIGS. 7A-C show another example of creating a new window split.
Figure 7B:
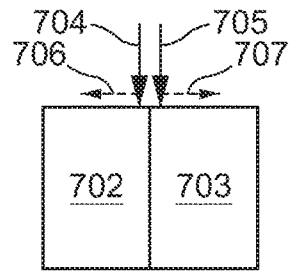
Figure 7C:
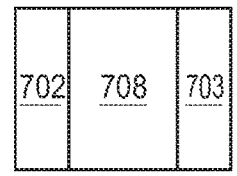

FIGS. 7A-C show another example of creating a new window split. In FIG. 7A, a monitor 700 is shown that has a window split 701, so that the monitor currently presents a windows 702 on the left and a window 703 on the right. The user may wish to separate the windows 702 and 703 from each other on the screen. In some implementations, this can be done using a multi-finger gesture on a touch-sensitive edge. FIG. 7B shows arrows 704 and 705 that schematically illustrate that the user touches two points on the upped edge of the monitor, essentially at the same time. For example, each arrow represents a touch made using the index finger of one hand. As another example, the touches can be made using two or more fingers on the same hand.

Still referring to FIG. 7B, an arrow 706 schematically illustrates that the user slides the touch of the arrow 704 to the left along the edge. Similarly, an arrow 707 illustrates that the user is sliding the touchpoint of the arrow 705 to the right along the edge. These sliding movements are occurring at essentially the same time, but not necessarily at the same speed.

The sliding apart of the touchpoints of a multi-finger touch can trigger one or more functions. FIG. 7C shows that a new window 708 has appeared. For example, the window 708 is a window of application content similar to the windows 702 and 703. As another example, the window 708 corresponds to a desktop background or other default content. Accordingly, the window 702 is still located on the left side but only a smaller portion of it is currently visible. For example, the window 702 has been resized to accommodate the window 708, or the window 702 is slid to the left so that only a part of it is currently visible. Similarly, less of the window 703 is visible on the right side than before. Accordingly, the user can conveniently create window space at a boundary between windows (i.e., where a window split exists).

In some implementations, the split corresponding to the multi-finger touches of the arrows 704 and 705 can also or instead be made when no window split exists on the screen and only a single window initially exists, say for example window 703 in FIG. 7A, if the window 702 were not present. In such a scenario, the final appearance of window 703 (FIG. 7C) can correspond to the resulting configuration of the originally present window. Windows 702 and 708, moreover, can then be windows that are created as a result of the multi-touch input.

Figure 8A:
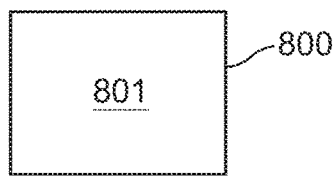
FIGS. 8A-C show another example of creating a new window split.
Figure 8B:
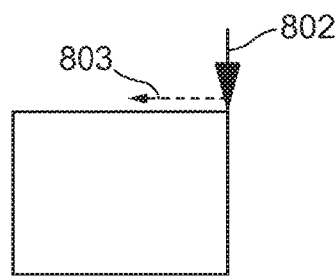
Figure 8C:
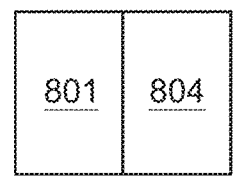

A touch-sensitive edge can be used to bring into view an existing window that is not currently visible on the screen. FIGS. 8A-C show another example of creating a new window split. FIG. 8A shows that a monitor 800 currently has a window 801 visible thereon. Assume, moreover, that another window has been defined but that the window is not currently visible on the monitor 800. FIG. 8B shows an arrow 802 schematically representing that a user touches a designated area of a touch-sensitive edge. Any dedicated area can be used, including, but not limited to, a corner of a polygonal touch-sensitive edge. An arrow 803 represents that the user slides the touchpoint along the edge. For example, the user can slide from the corner toward the rest of the screen. This can cause one or more currently hidden windows to be brought into view. For example, FIG. 8C shows that a window 804 is now present on the screen. The extent of the window 804 can depend on how far the user swipes along the edge. For example, the window 801 is currently still visible on the screen, but takes up less area than before the swipe.

A touch-sensitive edge can be used to control the orientation of one or more windows. FIGS. 9A-C show an example of manipulating a window using a touch-sensitive edge. FIG. 9A shows a monitor 900 that currently has a window 901 presented thereon. The orientation of the window 901 is indicated by a content 902, here a triangle pointing upward. The user can cause the system to rotate the window 901 using a touch-sensitive edge. FIG. 9B shows an arrow 903, indicating that the user touches a side of the edge, and an arrow 904, indicating an upward swiping motion. As another example, an arrow 903' and an arrow 904' indicate a swipe in the opposite direction made on an opposite edge. The direction of the swipe gesture can trigger a rotation of the window 901 in a corresponding direction. FIG. 9C shows that the window 901 has been rotated in a direction corresponding to the swiping gesture. Here, the window has been rotated 90 degrees in a counterclockwise direction. For example, this can cause one or more non-window areas 905 (e.g., background) to become visible.

It was mentioned above that a system can recognize substantially simultaneous touching at one or more points of a touch-sensitive edge. FIGS. 10A-D show examples of multi-finger touches. In these illustrations, the individual touchpoints are schematically illustrated, for example as circles. FIG. 10A schematically shows a multi-point touch on a touch-sensitive edge 1000. For example, the touch-sensitive edge 1000 can be a touch-sensitive bezel. In other implementations, the edge can be a border of a touch-sensitive screen. The multi-point touch here includes respective touchpoints 1001 and 1002. For example, the touchpoints 1001 and 1002 can be generated using fingers of the same hand. FIG. 10B schematically shows respective sliding touchpoints 1003 and 1004. FIG. 10C schematically shows sliding touchpoints 1005 and 1006. FIG. 10D schematically shows a sliding touchpoint 1007 on one side of a touch-sensitive edge (e.g., an upper edge) and another sliding touchpoint 1008 on another side of the touch-sensitive edge (e.g., a lower edge). The sliding can be done in substantially the same direction or in substantially opposite directions, to name just two examples. For example, same- or opposite-direction swiping can trigger different actions by the system.

In some implementations, one or more of the following inputs on the touch-sensitive edge can be recognized and trigger one or more functions in a system:
  a tap;
  a repeated tap (e.g., two taps in sufficiently close succession);
  a repeated tap followed by a swipe gesture;
  a multi-finger tap (e.g., tapping using two or more fingers simultaneously);
  a multi-finger repeated tap;
  a multi-finger tap followed by a swipe gesture;
  a long/short press (e.g., lasting longer (or shorter) than a predefined time);
  a multi-finger long/short press;
  a long/short press followed by a swipe gesture;
  a hard/soft press (e.g., generating an input signal of more/less than a predefined amplitude);
  a multi-finger hard/soft press; and/or
  a hard/soft press followed by a swipe gesture.

Figure 11A:
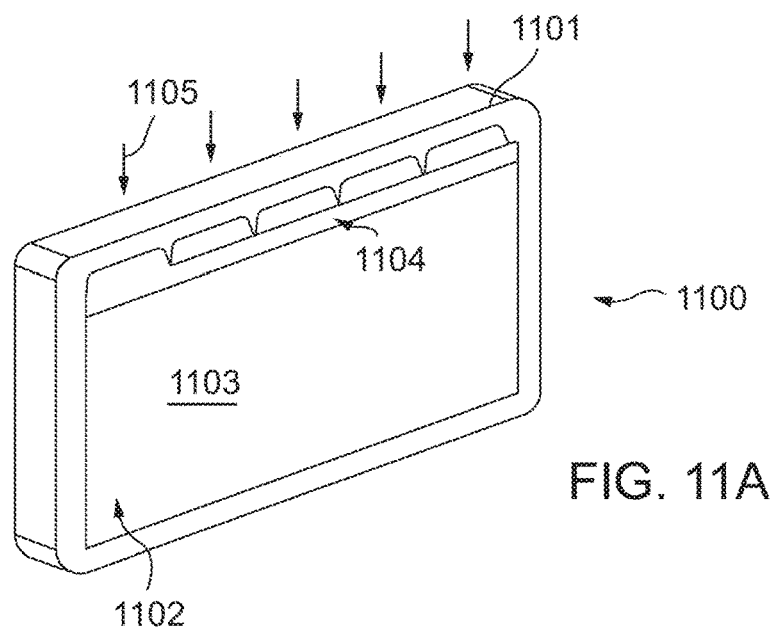
FIGS. 11A-C show examples of using a touch-sensitive edge.
Figure 11B:
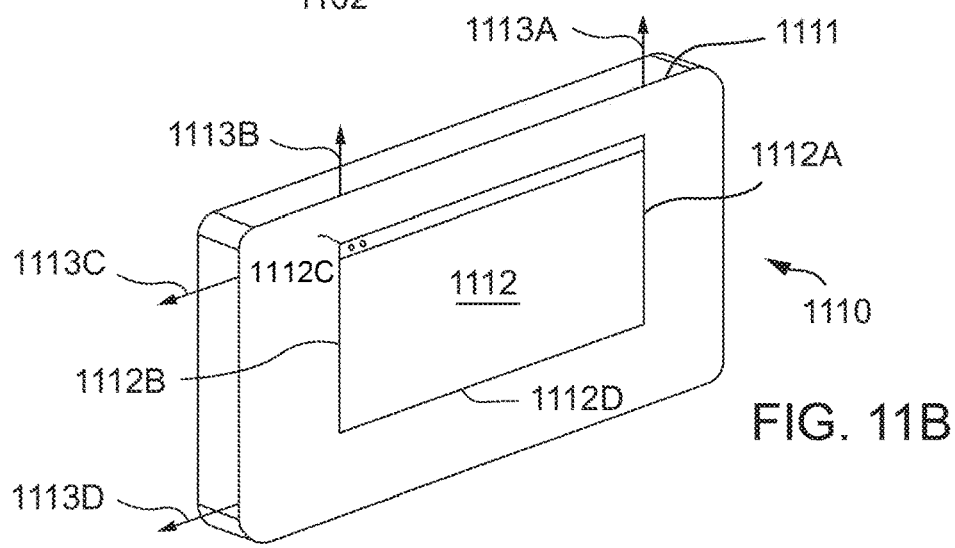
Figure 11C:
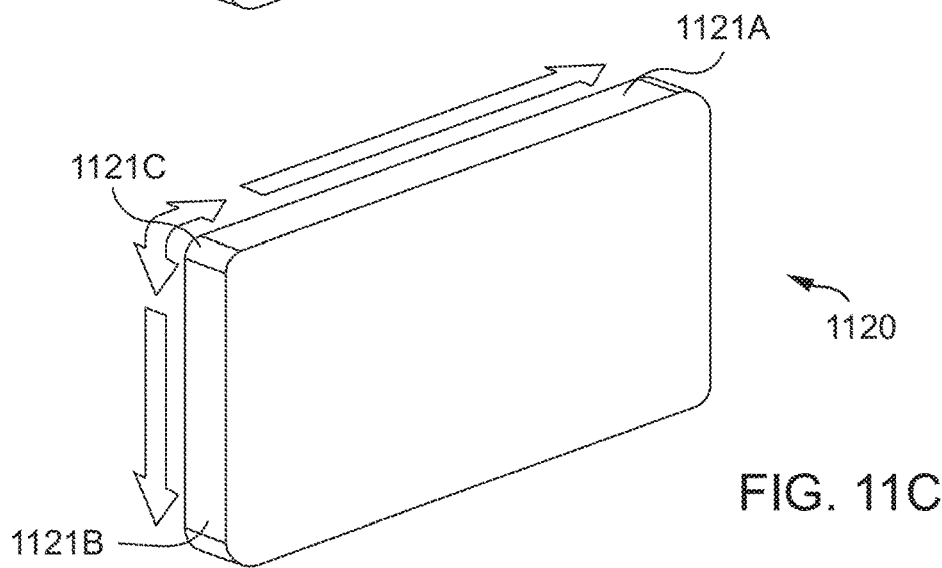

Other types of window manipulations can be made. FIGS. 11A-C show examples of using a touch-sensitive edge. FIG. 11A shows a device 1100, such as a smartphone, tablet or other portable device. The device has a touch-sensitive edge 1101, for example any of those exemplified above. On a screen 1102 of the device, a window 1103 is currently presented. Other available windows are indicated using tabs 1104. For example, the tabs are generated by an operating system or by an application such as a browser. Arrows 1105 schematically illustrates inputs that a user can make using the touch-sensitive edge 1101. The touch can control one or more device functions based on where on the edge it is made. For example, the touching can select one or more of the tabs 1104 for presentation of the corresponding window(s). As another example, two or more tabs can be rearranged on the screen.

A touch-sensitive edge can be used for triggering feedback to the user. For example, the device can emit a sound or a tactile feedback (e.g., a vibration) depending on where the input is made. FIG. 11B shows a device 1110 that has a touch-sensitive edge 1111. A window 1112 is currently presented on the screen. The window is bounded by a right edge 1112A, a left edge 1112B, a top edge 1112C and a bottom edge 1112D. For example, a user can interact with content presented in the window (e.g., an application) using a keyboard or a pointing device, for example. When the screen is touch sensitive, the user can also or instead interact by touching application controls presented inside the boundaries of the window 1112.

A visually impaired user may wish to determine where on the screen the window 1112 is located. For example, this can help the user apply a screen reader or other assistive functionality that aids the user in interacting with the device. The touch-sensitive edge can then be used to allow the user to detect the location of the window. For example, assume that the user slides his or her finger along the upper edge of the device to locate the horizontal position of the window 1112. An arrow 1113A schematically illustrates an output that the system can make when the touching is at a position corresponding to the right boundary 1112A. For example, a sound or a vibration can be generated. That is, the position of the arrow 1113A indicates that the output is generated when the sliding touch reaches the horizontal position of the right edge 1112A. In a sense, this can allow the user to "feel" the right edge of the window. An arrow 1113B, moreover, represents an output that corresponds to the user touching the horizontal position of the left edge 1112B. Similarly, arrows 1113C and D correspond to top and bottom boundaries 112C and D, respectively. The outputs can be of the same type or of different type. Outputs of the same type (e.g., audible) can be identical (e.g., a chime) or different from each other (e.g., the spoken words "left" or "right").

It has been mentioned that distinct areas of a touch-sensitive edge can be used for triggering separate functionality. FIG. 11C shows an example of a device 1120 where linear controlling motion and rotary controlling motion can be detected. The device 1120 has a touch-sensitive edge 1121A along its upper edge. Similarly, a touch-sensitive edge 1121B is positioned along its left edge. Other edges of the device may also have corresponding touch-sensitive edges. A touch-sensitive edge 1121C is positioned at a corner of the device, such as a rounded corner of the device housing. The corner radius can be used for touch sensitivity. For example, this can trigger a rotary control, such as when a window or other object is to be rotated on the display, or another type of rotary setting. The edges 112A-B, on the other hand, can trigger linear control of one or more functions.

Figure 12:
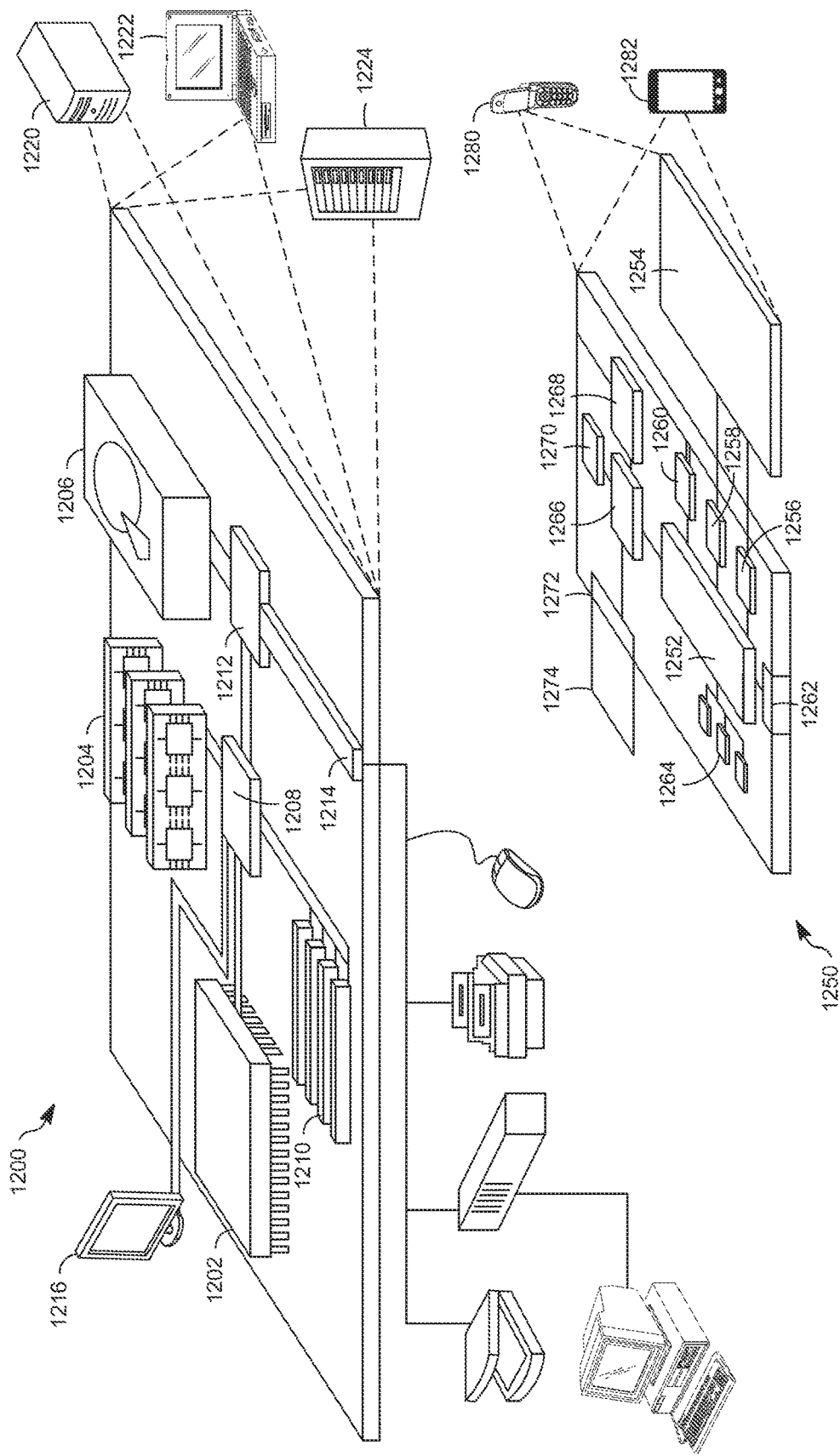
FIG. 12 shows an example of a computer device and a mobile computer device that can be used to implement the techniques described here.

FIG. 12 shows an example of a generic computer device 1200 and a generic mobile computer device 1250, which may be used with the techniques described here. Computing device 1200 is intended to represent various forms of digital computers, such as laptops, desktops, tablets, workstations, personal digital assistants, televisions, servers, blade servers, mainframes, and other appropriate computing devices. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. The processor 1202 can be a semiconductor-based processor. The memory 1204 can be a semiconductor-based memory. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving, by a processor of a computing device, an input generated by a user touching a location on a touch-sensitive hardware bezel;
   determining whether a display contains a window split; and
   when the display contains the window split:
     determining, in response to the input, whether the location is within a predefined proximity of the window split;
     when the location is within the predefined proximity of the window split, repositioning the window split on the display based on the input;
     receiving a clear-split input generated using the hardware bezel; and
     clearing, in response to the clear-split input, at least the window split from the display.

2. The method of claim 1, wherein when the display does not contain the window split, and when the location is not within the predefined proximity of the window split, the method further comprises creating, in response to the input, a new window split on the display based on the location.

3. The method of claim 1, wherein the display is included in a monitor.

4. The method of claim 1, wherein to reposition the window split on the display, the user touches the location on the touch-sensitive hardware bezel and performs a swipe along the touch-sensitive hardware bezel, and wherein the window split is repositioned on the display based on the swipe.

5. The method of claim 1, wherein the touch-sensitive hardware bezel comprises multiple adjacent edges, wherein the predefined proximity comprises that the location is on a same edge as the window split and within a predefined distance of the window split, and wherein when the location is not on the same edge as the window split then the location is not within the predefined proximity of the window split.

6. The method of claim 5, wherein the touch-sensitive hardware bezel is rectangular, and wherein all four edges are touch sensitive.

7. The method of claim 6, wherein the display has the window split and the new window split is created, such that a first window is defined on one side of the window split, and second and third windows are defined on an opposite side of the window split, the second and third windows separated by the new window split, and wherein: (i) if another input is received that is made within the predefined proximity of the new window split on an edge adjacent the second and third windows, then the second and third windows, and not the first window, will be resized, whereas (ii) if the other input is made on an opposite edge adjacent the first window, then the first window, and not the second and third windows, will be resized.

8. The method of claim 1, wherein the new window split is orthogonal to the window split.

9. The method of claim 8, wherein the new window split extends between the touch-sensitive hardware bezel and the window split.

10. The method of claim 8, further comprising receiving, after creating the new window split, another input generated using the touch-sensitive hardware bezel, wherein the other input repositions the window split on the display, and wherein the repositioning resizes multiple windows defined in part by the new window split.

11. The method of claim 1, wherein creating the new window split comprises diminishing a size of a window on the display, the method further comprising initiating a default window in a space created by the diminished size.

12. The method of claim 1, wherein creating the new window split comprises diminishing a size of a window on the display, the method further comprising prompting the user to choose a new window to be initiated in a space created by the diminished size.

13. The method of claim 1, wherein the touch-sensitive hardware bezel has multiple corners, and wherein the clear-split input is generated by touching at least one of the corners.

14. The method of claim 13, wherein the clear-split input causes only a most recently created window split to be cleared.

15. The method of claim 1, wherein the window split is included on the display and defines a boundary between a first window and a second window, and wherein repositioning the window split on the display based on the input comprises enlarging the first window, and reducing the second window by an amount corresponding to the enlargement.

16. The method of claim 1, wherein the display is configured to have presented thereon windows without visible frames or other boundaries such that contents of adjacent windows abut each other.

17. The method of claim 1, wherein the computing device comprises a portable device in which a housing contains the display, the method further comprising distinguishing the input generated by the user touching the location on the touch-sensitive hardware bezel of the housing, from another input generated by the user when holding the portable device.

18. The method of claim 1, wherein the computing device comprises a proxy device separate from the display, wherein the window split is associated with a proxy position on the proxy device, and wherein the predefined proximity is defined relative to the proxy position, the method further comprising sending a signal to the display corresponding to either the repositioning of the window split on the display based on the input, or the creation of the new window split on the display.

19. The method of claim 1, wherein the touch-sensitive hardware bezel comprises at least an edge and a corner of a housing, and wherein the input is generated using the edge of the housing, the method further comprising receiving another input generated using the corner of the housing, and, in response to the other input, actuating a rotary control in the computing device.

20. The method of claim 1, wherein the display contains the window split and wherein the input includes a swipe gesture toward the window split, the method further comprising determining when the swipe gesture reaches a location of the window split, and thereafter matching the repositioning of the window split with the swipe gesture.

21. A computer program product tangibly embodied in a non-transitory computer-readable medium and including executable instructions that, when executed, cause a computing device to perform operations including:
  receiving, by the computing device, an input generated by a user touching a location on a touch-sensitive hardware bezel;
  determining whether a display contains a window split; and
  when the display contains the window split:
    determining, in response to the input, whether the location is within a predefined proximity of the window split;
    when the location is within the predefined proximity of the window split, repositioning the window split on the display based on the input;
    receiving a clear-split input generated using the hardware bezel; and
    clearing, in response to the clear-split input, at least the window split from the display.

22. The computer program product of claim 21, wherein when the display does not contain the window split, and when the location is not within the predefined proximity of the window split, the operations further comprise creating, in response to the input, a new window split on the display based on the location.

23. The computer program product of claim 21, wherein to reposition the window split on the display, the user touches the location on the touch-sensitive hardware bezel and performs a swipe along the touch-sensitive hardware bezel, and wherein the window split is repositioned on the display based on the swipe.

24. A system comprising:
  a display;
  a computing device having a touch-sensitive hardware bezel; and
  a computer program product tangibly embodied in a non-transitory computer-readable medium and including executable instructions that, when executed, cause the computing device to perform operations including:
    receiving, by the computing device, an input generated by a user touching a location on the touch-sensitive hardware bezel;
    determining whether the display contains a window split;
    when the display contains the window split:
      determining, in response to the input, whether the location is within a predefined proximity of the window split;
      when the location is within the predefined proximity of the window split, repositioning the window split on the display based on the input;
      receiving a clear-split input generated using the hardware bezel; and
      clearing, in response to the clear-split input, at least the window split from the display.

25. The system of claim 24, wherein when the display does not contain the window split, and when the location is not within the predefined proximity of the window split, the operations further comprise creating, in response to the input, a new window split on the display based on the location.

26. The system of claim 24, wherein the display is included in the computing device.

27. The system of claim 24, wherein the touch-sensitive bezel is positioned on a housing of the computing device.

* * * * *